(12) United States Patent
Kyle

(10) Patent No.: X7759
(45) Date of Patent: Sep. 16, 1833

(54) LOCK, DOOR

(76) Inventor: James Kyle

United States Patent
Patent No.: X7759
X7759
J. Kyle.
Door Lock.
Patented Sep. 16, 1833.
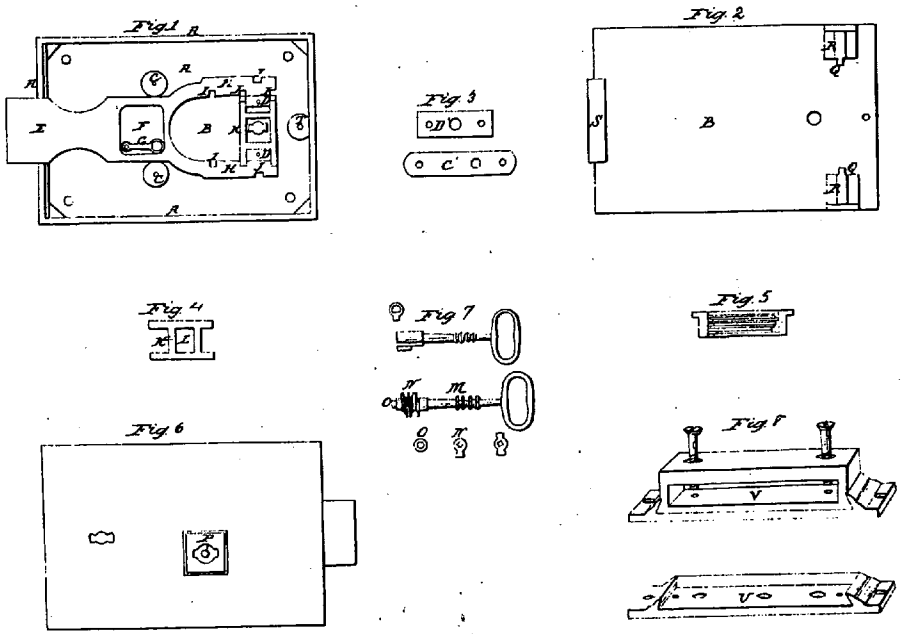
AM. PHOTO-LITHO. CO. N.Y. (SOUTHWICK'S PROCESS.)